(12) United States Patent
Kanao et al.

(10) Patent No.: US 8,202,666 B2
(45) Date of Patent: Jun. 19, 2012

(54) UNIT CELL ASSEMBLY, FUEL CELL, AND METHOD FOR MANUFACTURING UNIT CELL ASSEMBLY

(75) Inventors: Masaaki Kanao, Toyota (JP); Kenji Sato, Toyota (JP); Hiroshi Nishiyama, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 422 days.

(21) Appl. No.: 12/418,782

(22) Filed: Apr. 6, 2009

(65) Prior Publication Data

US 2009/0253010 A1 Oct. 8, 2009

(30) Foreign Application Priority Data

Apr. 4, 2008 (JP) ................................ 2008-098376

(51) Int. Cl.
*H01M 8/04* (2006.01)
*H01M 2/38* (2006.01)

(52) U.S. Cl. ........................................ 429/514; 429/457

(58) Field of Classification Search ................. 429/452, 429/453, 454, 456, 458, 460, 463, 457, 514
See application file for complete search history.

(56) References Cited

U.S. PATENT DOCUMENTS

| 5,736,269 | A | * | 4/1998 | Okamoto et al. ............. 429/456 |
| 7,504,173 | B2 | | 3/2009 | Kuroki et al. |
| 2002/0150810 | A1 | * | 10/2002 | Mizuno ........................ 429/35 |
| 2003/0003342 | A1 | * | 1/2003 | Sugita et al. ................. 429/35 |
| 2009/0148750 | A1 | * | 6/2009 | Okonogi et al. .............. 429/36 |

FOREIGN PATENT DOCUMENTS

| JP | 2004047495 | | 2/2004 |
| JP | 2005276461 | | 10/2005 |
| JP | 2006216240 | | 8/2006 |
| JP | 2007149393 | | 6/2007 |
| JP | 2007149393 | A | 6/2007 |
| JP | 2007193970 | | 8/2007 |
| WO | WO-0201658 | | 1/2002 |
| WO | WO 2007083214 | A1 * | 7/2007 |

* cited by examiner

*Primary Examiner* — Jerry Lorengo
*Assistant Examiner* — Carlos Barcena
(74) *Attorney, Agent, or Firm* — Gifford, Krass, Sprinkle, Anderson & Citkowski, P.C.

(57) ABSTRACT

A unit cell assembly, stacked in a plurality to form a fuel cell, includes: a separator; a unit cell constituent member disposed at a first region on one face of the separator; a seal member which is formed of an elastic member and bonded to a second region surrounding the first region on one face of the separator, and which is integrated with at least part of a peripheral edge of the unit cell constituent member; and a first insulating portion having insulating properties and provided at least on part of a peripheral edge of the separator.

20 Claims, 18 Drawing Sheets

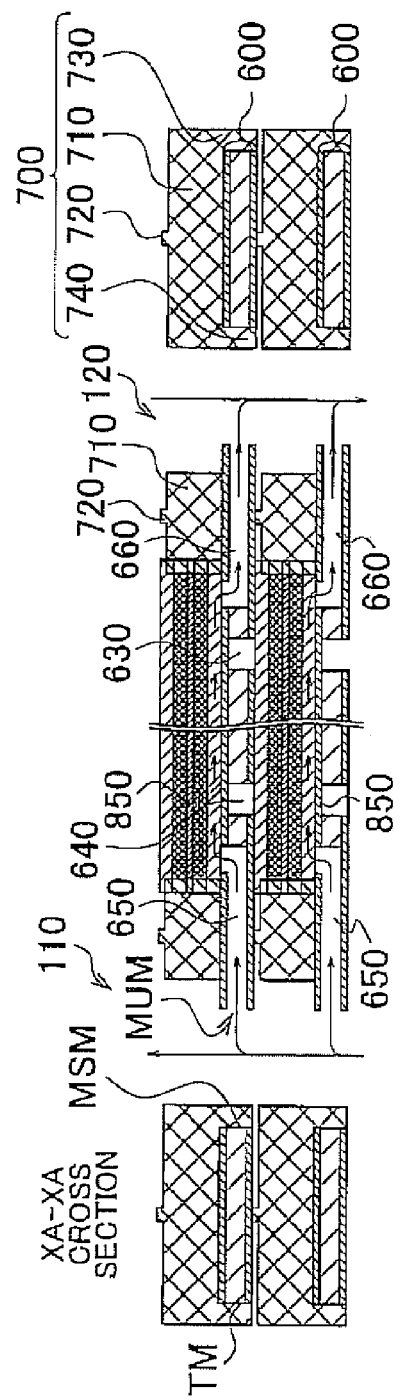
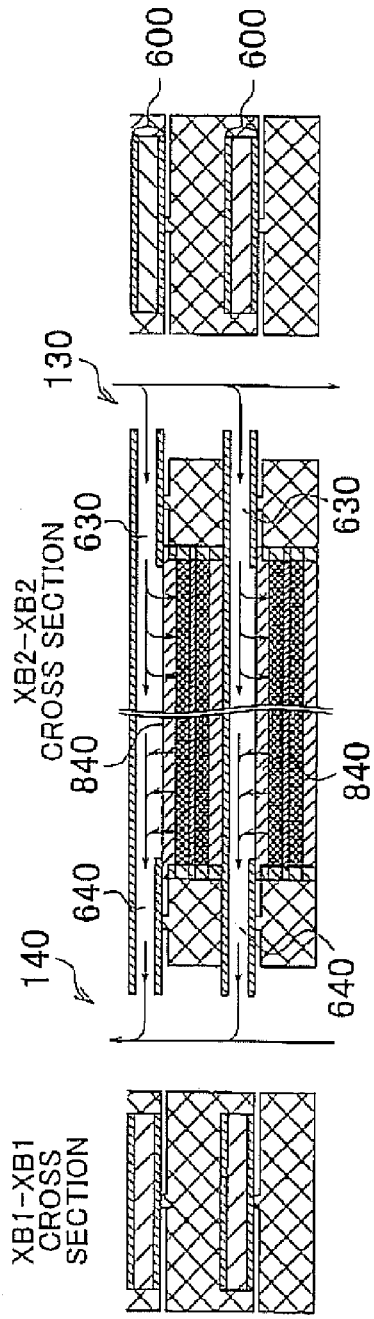

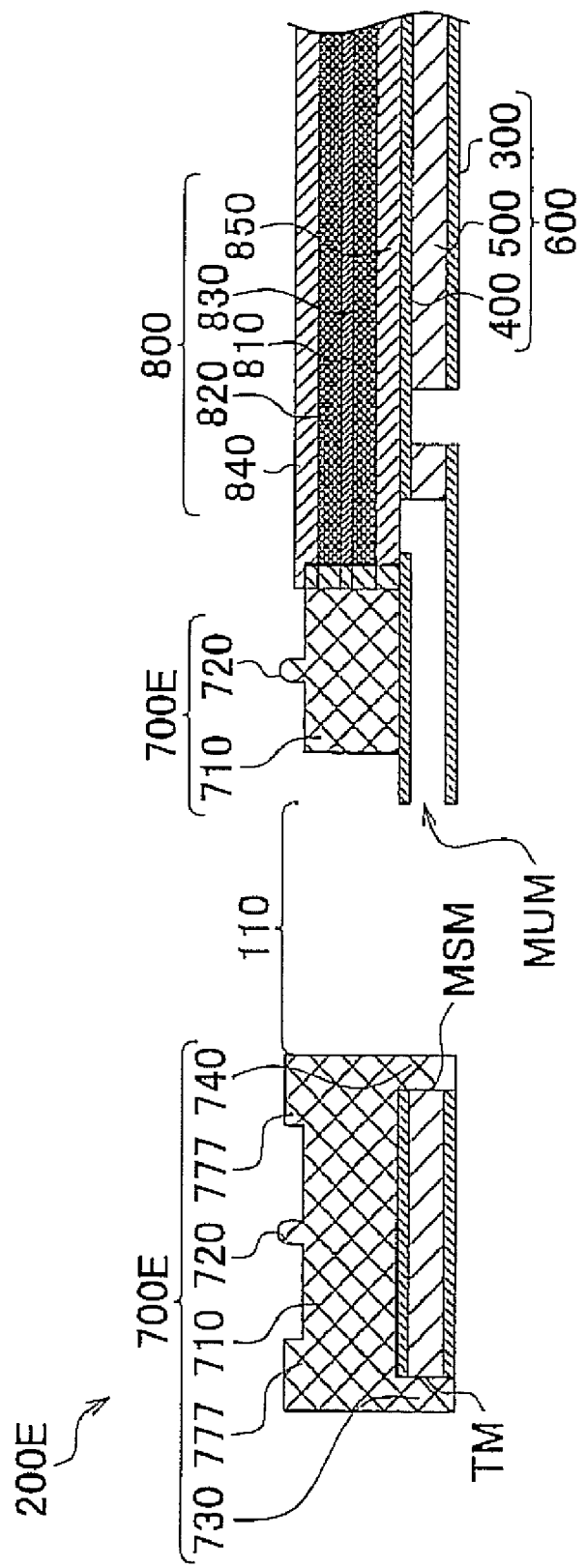

UNIT CELL ASSEMBLY, FUEL CELL, AND METHOD FOR MANUFACTURING UNIT CELL ASSEMBLY

INCORPORATION BY REFERENCE

The disclosure of Japanese Patent Application No. 2008-098376 filed on Apr. 4, 2008 including the specification, drawings and abstract is incorporated herein by reference in its entirety.

BACKGROUND OF THE INVENTION

1. Field of the Invention

The invention relates to a fuel cell and to a manufacturing method thereof.

2. Description of the Related Art

Fuel cells are provided with, for instance, unit cell constituent members, having each a substantially plate-like membrane electrode assembly (MEA), that are alternatively stacked with separators (see Japanese Patent Application Publication No. 2007-149393 (JP-A-2007-149393)).

In such fuel cells, however, the fuel cell stack may slip, for instance owing to external forces, deterioration or the like, and neighboring separators may come into contact with each other, giving rise to short circuits. Short circuits may result in various problems such as loss of power generation efficiency in the fuel cell.

SUMMARY OF THE INVENTION

The invention suppresses short circuits that occur in a fuel cell when separators come into contact with each other.

A first aspect of the invention relates to a unit cell assembly stacked in a plurality to form a fuel cell. The unit cell assembly has a separator; a unit cell constituent member disposed at a first region on one face of the separator; a seal member, which is formed of an elastic member and bonded to a second region surrounding the first region on one face of the separator, and which is integrated with at least part of a peripheral edge of the unit cell constituent member; and a first insulating portion having insulating properties and provided at least on part of a peripheral edge of the separator.

Short circuits occurring when separators come into contact with each other can be prevented in a fuel cell that has a stack of a plurality of such unit cell assemblies.

In the unit cell assembly according to the above aspect, the first insulating portion may be provided at an edge face of the separator.

Short circuits caused by contact between separators in a fuel cell can be suppressed thereby.

The seal member may have, as the first insulating portion, a first covering portion that covers an edge face at a peripheral edge of the separator.

Short circuits caused by contact between separators in a fuel cell can be suppressed thereby at the same time that the number of parts in the fuel cell is reduced.

The first insulating portion may be a cap-like member that covers an edge face at a peripheral edge of the separator.

Thereby, an insulating portion can be easily formed on the separator, and slippage of the unit cell assembly stack in the fuel cell can also be prevented.

The separator may have a conductive plate-like member and a resinous plate-like member formed of a resin; and the resinous plate-like member may have a second covering portion, as the first insulating portion, that covers an edge face of the conductive plate-like at a peripheral edge of the separator.

Short circuits caused by contact between separators in a fuel cell can be suppressed thereby at the same time that the number of parts in the fuel cell is reduced.

The first insulating portion may be an oxidatively-treated portion formed by subjecting the separator to an oxidative treatment.

Short circuits caused by contact between separators in a fuel cell can be suppressed thereby at the same time that the number of parts in the fuel cell is reduced.

The first insulating portion may be formed through coating with alumina or magnesia.

The insulating portion can be easily formed thereby on the separator.

The first insulating portion may have a first projection extending in a thickness direction of the unit cell assembly.

Slippage of the unit cell assembly stack in the fuel cell can be prevented thereby.

The separator may have a manifold, which extends through a thickness direction of the unit cell assembly, and through which a reactant gas or a cooling medium flows; and the unit cell assembly may have a second insulating portion optionally having insulating properties and provided at a peripheral edge of the manifold of the separator.

Short circuits caused by contact between separators in a fuel cell can be suppressed thereby.

The second insulating portion may have a second projection extending in a thickness direction of the unit cell assembly.

Slippage of the unit cell assembly stack in the fuel cell can be prevented thereby.

A second aspect of the invention relates to a unit cell assembly stacked in a plurality to form a fuel cell. The unit cell assembly has a separator provided with a manifold which extends through a thickness direction of the unit cell assembly, and through which a reactant gas or a cooling medium flows; a unit cell constituent member disposed on one face of the separator at a first region; a seal member, which is formed of an elastic member and bonded to a second region surrounding the first region on one face of the separator, and which is integrated with at least part of a peripheral edge of the unit cell constituent member; and a manifold insulating portion having insulating properties and provided at least on part of a peripheral edge of the manifold of the separator.

Short circuits caused by contact between separators in a fuel cell can be suppressed thereby.

A third aspect of the invention relates to a fuel cell resulting from stacking a plurality of unit cell assemblies according to the first aspect or the second aspect.

Short circuits caused by contact between separators can be suppressed in such a fuel cell.

A fourth aspect of the invention relates to a method for manufacturing a unit cell assembly in which a separator and a unit cell constituent member are stacked. This method for manufacturing a unit cell assembly includes the steps of arranging the unit cell constituent member on one face of the separator at a first region; molding a seal member formed of an elastic member to be bonded to a second region surrounding the first region on one face of the separator, and to be integrated with a peripheral edge of the unit cell constituent member; and providing an insulating portion at a peripheral edge of the separator.

This method for manufacturing a unit cell assembly allows manufacturing a unit cell assembly in which an insulating portion is provided at a peripheral edge of a separator. Short circuits caused by contact between separators can be suppressed in a fuel cell having a stack of a plurality of unit cell assemblies thus manufactured.

A fifth aspect of the invention relates to a method for manufacturing a unit cell assembly in which a separator and a unit cell constituent member are stacked. This method for manufacturing a unit cell assembly includes the steps of arranging the separator in a mold; arranging the unit cell constituent member at a first region on one face of the separator; molding a seal member through injection molding or compression molding of a molding material in a space that is demarcated by a second region surrounding the first region on one face of the separator, a peripheral edge of the unit cell constituent member, and the mold; and providing an insulating portion at a peripheral edge of the separator.

This method for manufacturing a unit cell assembly allows manufacturing a unit cell assembly in which an insulating portion is provided at a peripheral edge of a separator. Short circuits caused by contact between separators can be suppressed in a fuel cell having a stack of a plurality of unit cell assemblies thus manufactured.

The invention is not limited to the above-described fuel cell manufacturing method, and may be realized as aspects of other invention methods, such as a method for manufacturing a separator or a unit cell assembly. The invention is not limited to a fuel cell, and may be realized in other aspects, such as a separator or a unit cell assembly.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein:

FIGS. 10A and 10B are illustrative diagrams showing the flow of reactant gases in the fuel cell;

FIG. 18 is an illustrative diagram depicting the construction of a unit cell assembly in a sixth embodiment.

DETAILED DESCRIPTION OF EMBODIMENTS

A fuel cell, a fuel cell manufacturing method and a unit cell assembly according to the invention will be explained next on the basis of embodiments, with reference to accompanying drawings.

Figure 1:
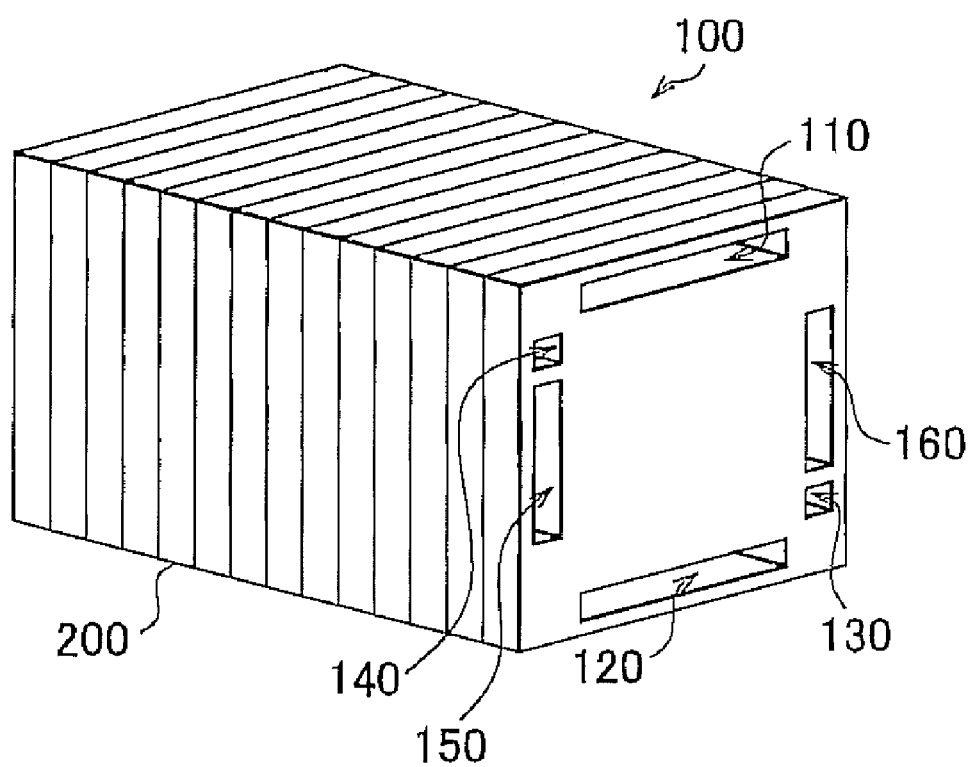
FIG. 1 is an illustrative diagram depicting the construction of a fuel cell 100 in a first embodiment.
Figure 2:
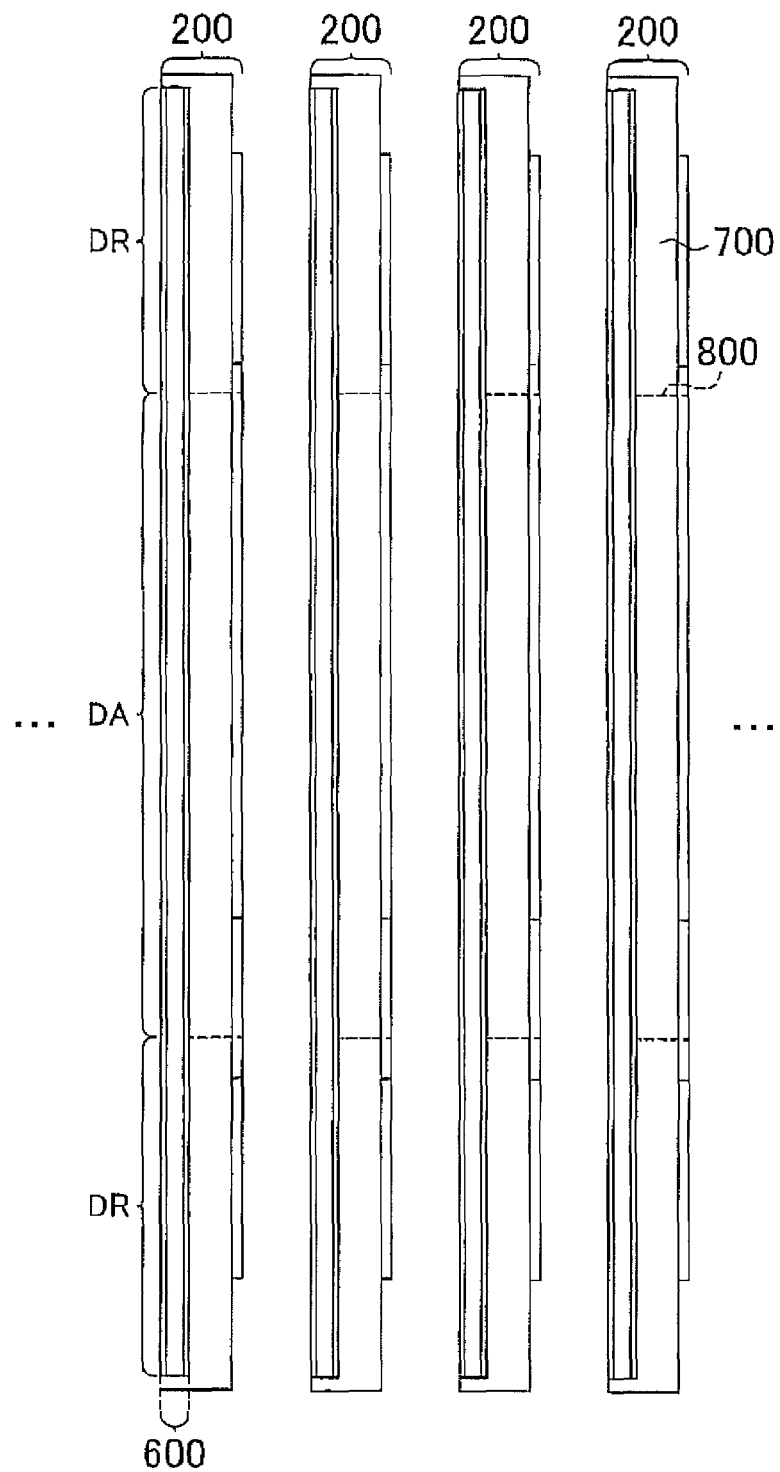
FIG. 2 is a side-view diagram of unit cell assemblies 200 that make up the fuel cell 100.
Figure 3:
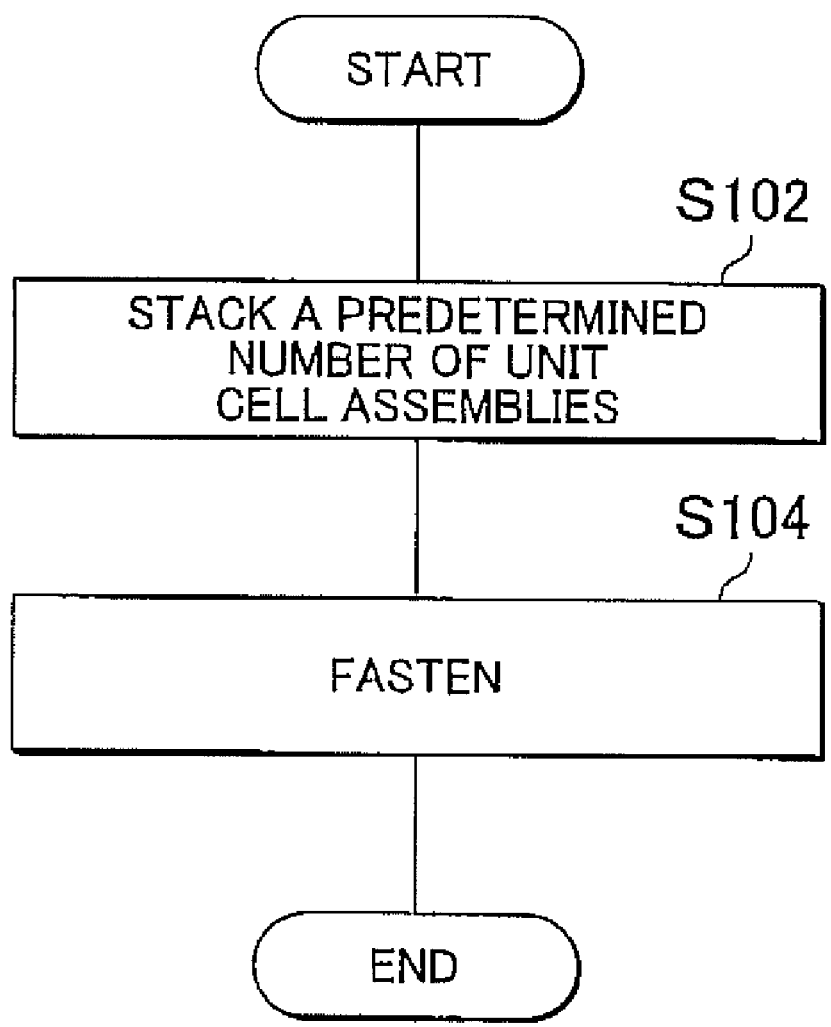
FIG. 3 is a flowchart illustrating manufacturing steps of the fuel cell in the first embodiment.

The schematic construction of a fuel cell according to a first embodiment of the invention is explained next. FIG. 1 is an illustrative diagram depicting the construction of a fuel cell 100 in the first embodiment. FIG. 2 is a side-view diagram of unit cell assemblies 200 that make up the fuel cell 100. FIG. 3 is a flowchart illustrating the manufacturing steps of the fuel cell in the first embodiment. In FIG. 2, the unit cell assemblies 200 are depicted spaced apart from each other, although in actuality the unit cell assemblies 200 are contiguous to each other. The unit cell assemblies 200 illustrated in FIG. 2 are depicted each with a seal member 700, a unit cell constituent member 800, a power generation region DA and a surrounding region DR. These are described in detail below.

As illustrated in FIGS. 1 and 2, the fuel cell 100 has a structure (called a stack structure) in which a plurality of unit cell assemblies 200 is stacked. The direction in which the unit cell assemblies 200 are stacked is called the stacking direction, while the direction perpendicular to the stacking direction and extending across the planes of the unit cell assemblies 200 is called the planar direction. As illustrated in FIG. 3, the fuel cell 100 is manufactured by stacking a predetermined number of unit cell assemblies 200 (step S102), and then fastening the unit cell assemblies 200 in the stacking direction by applying a predetermined fastening force (step S104). The thickness direction of the below-described members that are provided in the unit cell assemblies 200 is substantially the same as the stacking direction.

As illustrated in FIG. 1, the fuel cell 100 has an oxidizing gas supply manifold 110 that is supplied with an oxidizing gas, an oxidizing gas discharge manifold 120 that discharges the oxidizing gas, a fuel gas supply manifold 130 that is supplied with a fuel gas, a fuel gas discharge manifold 140 that discharges the fuel gas, a cooling medium supply manifold 150 that supplies a cooling medium, and a cooling medium discharge manifold 160 that discharges the cooling medium.

The fuel cell 100 generates electric power through supply of the oxidizing gas to the oxidizing gas supply manifold 110 and through supply of the fuel gas to the fuel gas supply manifold 130. During power generation by the fuel cell 100, a cooling medium is supplied to the cooling medium supply manifold 150 in order to restrain the temperature rise of the fuel cell 100, which is caused by the release of heat that accompanies power generation. For instance, air is used as the oxidizing gas, while hydrogen or the like is used as the fuel gas. The oxidizing gas and the fuel gas are also called reactant gases. As the cooling medium there is used, for instance, water, an antifreeze liquid such as ethylene glycol, or air.

Figure 4:
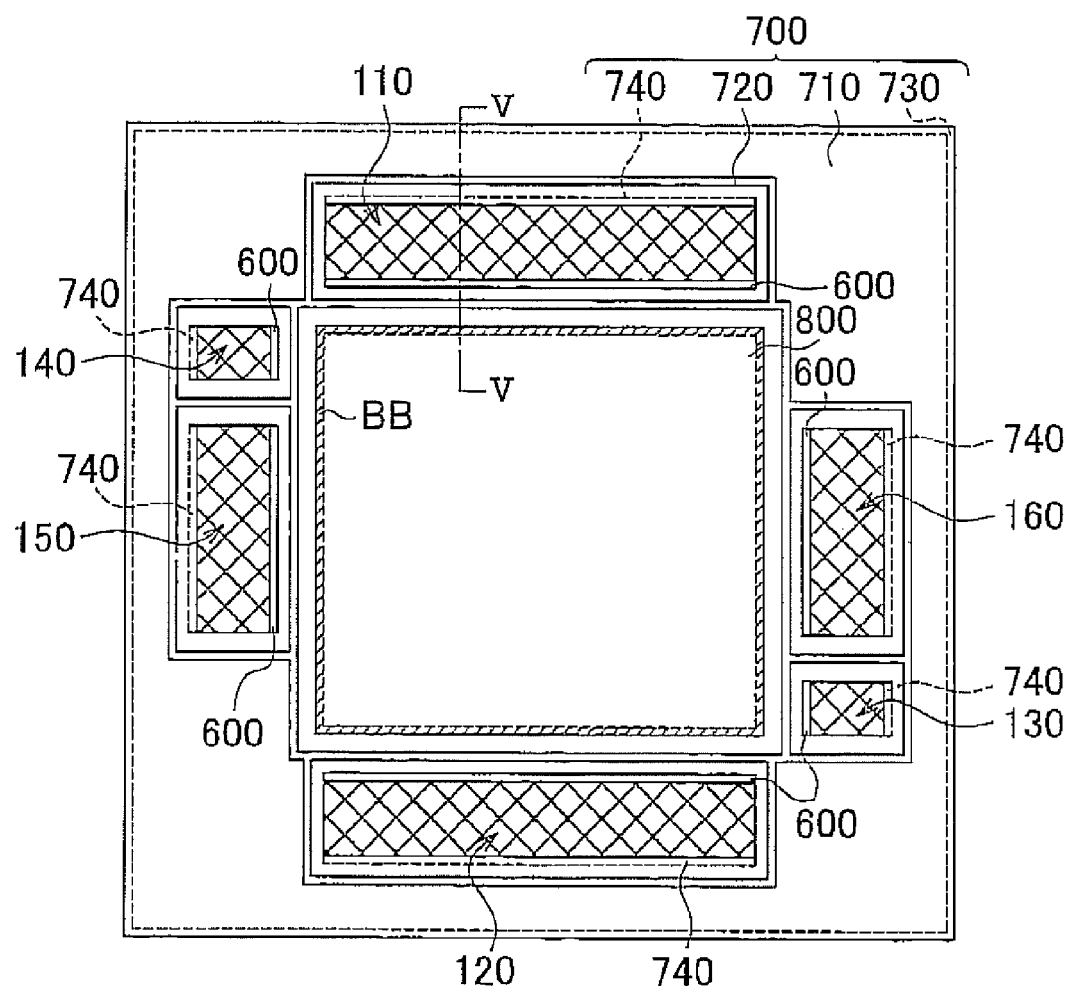
FIG. 4 is a diagram illustrating a front view of a unit cell assembly 200 (viewed from the right side in FIG. 2)
Figure 5:
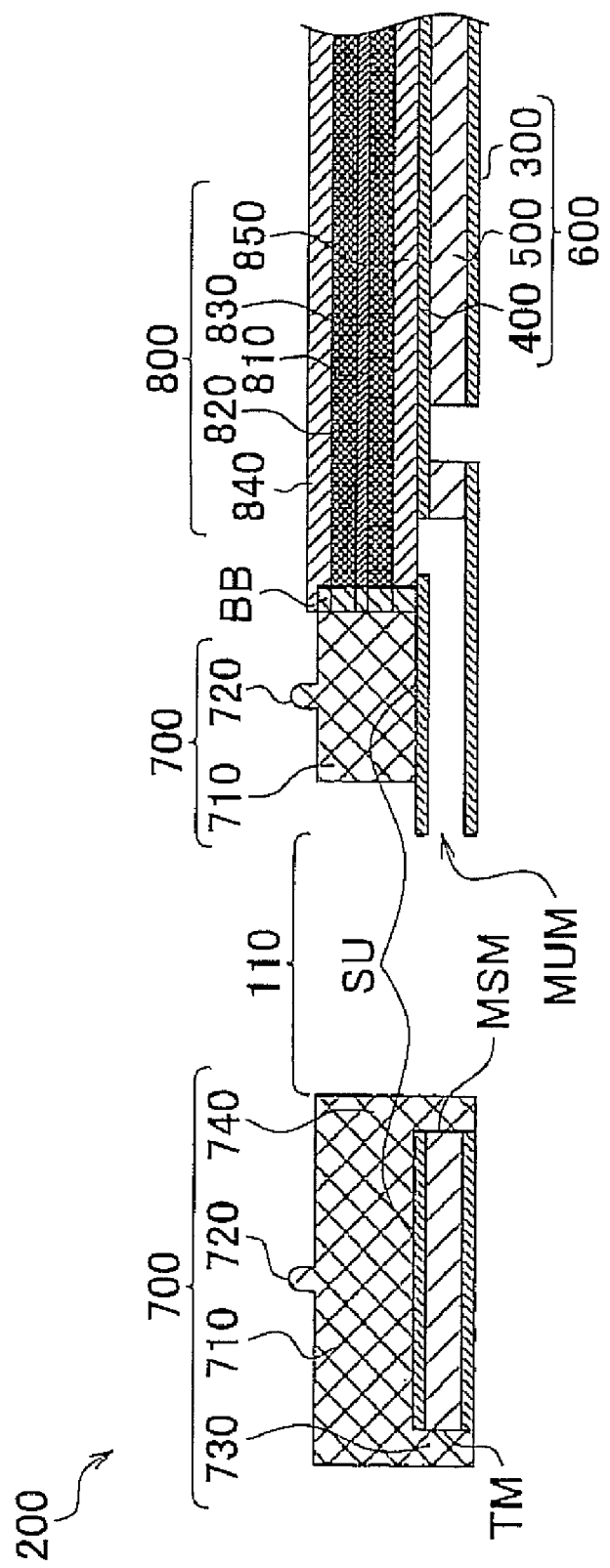
FIG. 5 is a cross-sectional diagram illustrating a cross section V-V in FIG. 4.

The construction of a unit cell assembly 200 will be explained next with reference to FIGS. 4 and 5, in addition to FIG. 2. FIG. 4 is a diagram illustrating a front view of a unit cell assembly 200 (viewed from the right side in FIG. 2). FIG. 5 is a cross-sectional diagram illustrating a cross section V-V in FIG. 4.

As illustrated in FIGS. 2, 4 and 5, each unit cell assembly 200 has the separator 600, the unit cell constituent member 800 and the seal member 700. In these various members, a surface located at the peripheral edge of the member and extending along the stacking direction will also be called an edge face. The end face of the separators 600 will also be called the edge face TM.

Each separator 600 has an anode plate 300, a cathode plate 400, an intermediate plate 500 and a conductive porous member 555.

Figure 6:
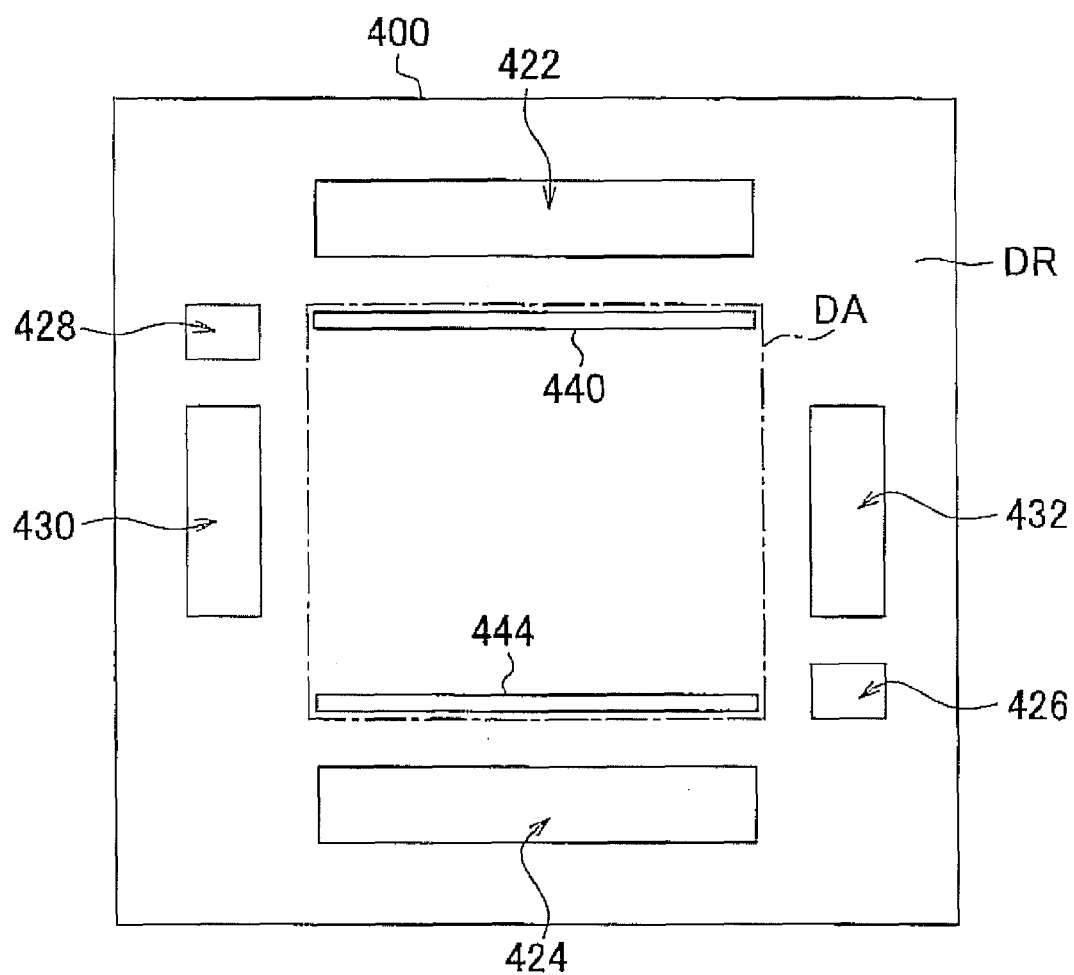
FIG. 6 is an illustrative diagram depicting the shape of a cathode plate 400.
Figure 7:
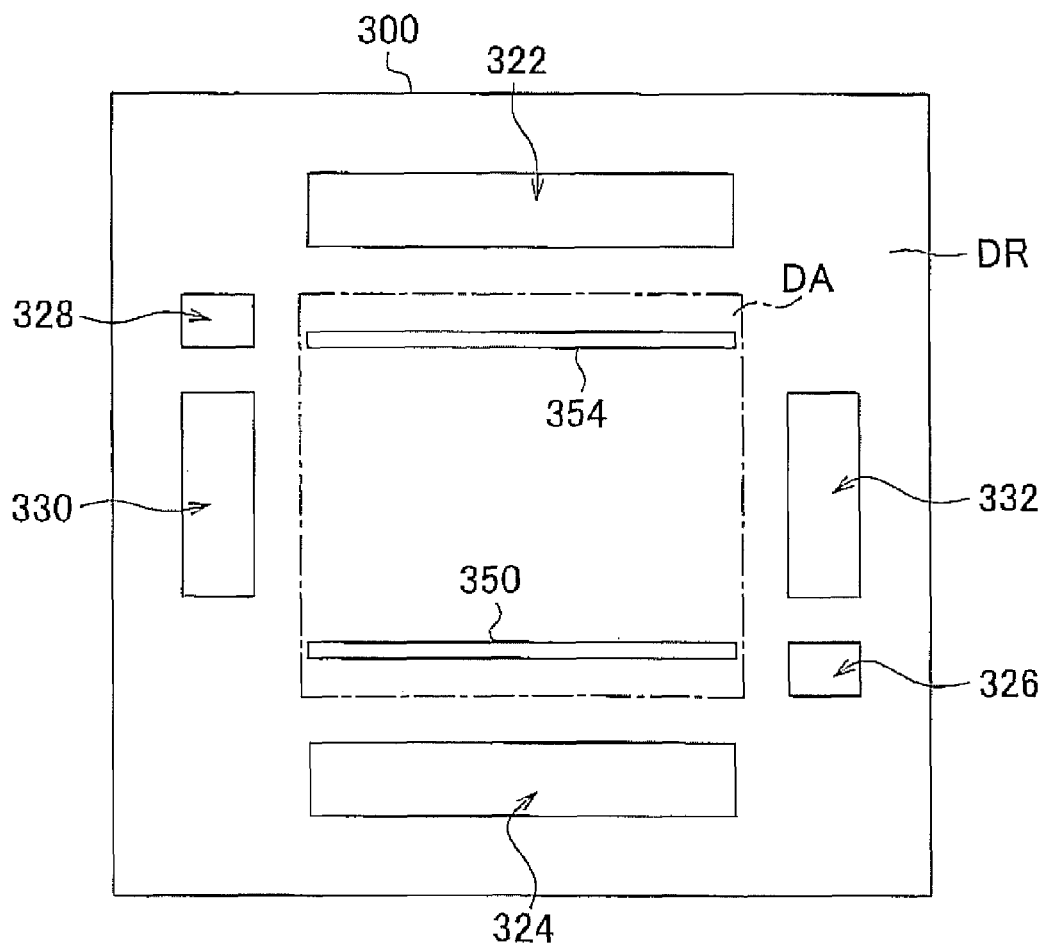
FIG. 7 is an illustrative diagram depicting the shape of an anode plate 300.
Figure 8:
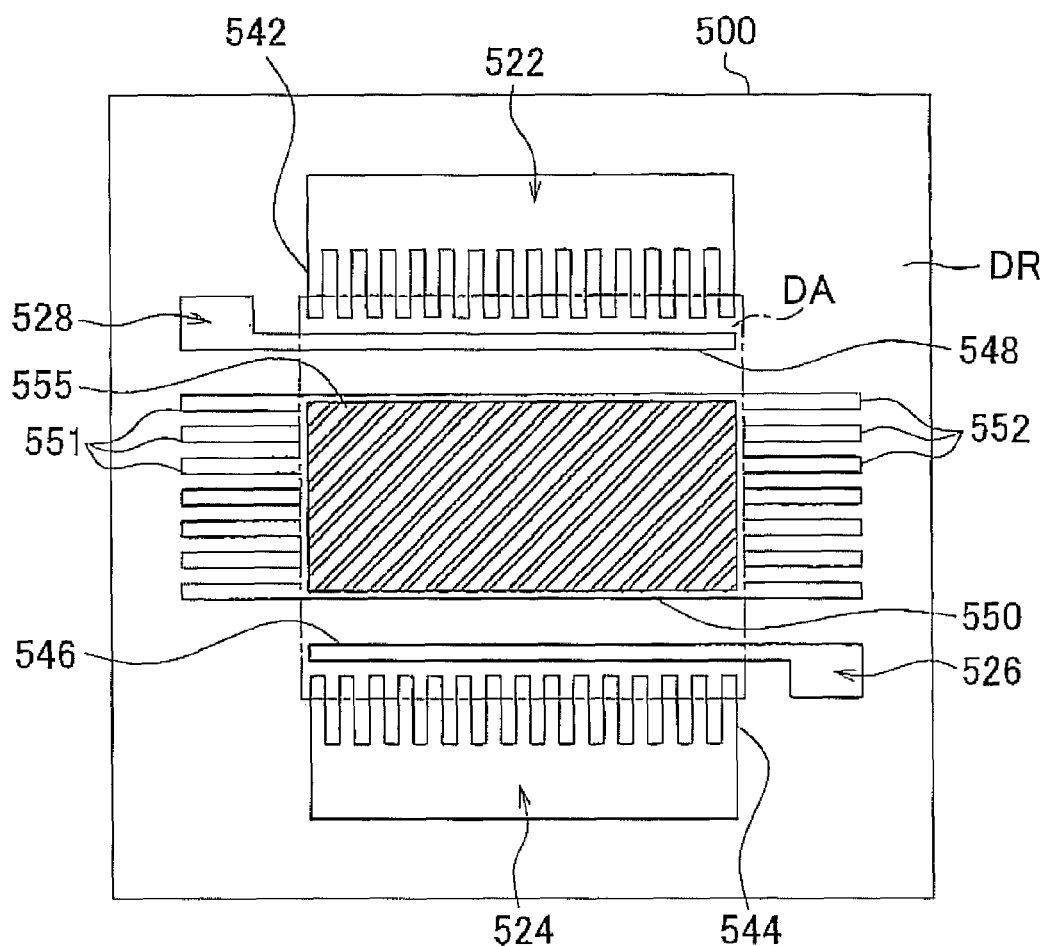
FIG. 8 is an illustrative diagram depicting the shape of an intermediate plate 500.

FIG. 6 is an illustrative diagram depicting the shape of the cathode plate 400. FIG. 7 is an illustrative diagram depicting the shape of the anode plate 300. FIG. 8 is an illustrative diagram depicting the shape of the intermediate plate 500. FIGS. 6 to 8 depict the plates 400, 300 and 500 viewed from the right side in FIG. 2. In FIGS. 6 to 8, a region DA in a central portion of each of the plates 300, 400, 500, denoted by a dashed line, is in the unit cell assemblies 200 a region corresponding to the region at which the unit cell constituent member 800 is disposed (referred to hereinafter as "power generation region DA").

The cathode plate 400 illustrated in FIG. 6 is formed, for example, of a stainless steel. The cathode plate 400 has six manifold-forming portions 422 to 432, an oxidizing gas supply slit 440, and an oxidizing gas discharge slit 444. The manifold-forming portions 422 to 432, which are through-opening portions for forming the various manifolds during construction of the fuel cell 100, are provided outside the power generation region DA. The oxidizing gas supply slit 440 is disposed at an end portion (upper end in FIG. 6) of the power generation region DA. The oxidizing gas discharge slit 444 is disposed at an end portion (lower end in FIG. 6) of the power generation region DA.

As illustrated in FIG. 7, the anode plate 300 is formed, for instance, of stainless steel, like the cathode plate 400. Similarly to the cathode plate 400, the anode plate 300 is provided with six manifold-forming portions 322 to 332, a fuel gas supply slit 350, and a fuel gas discharge slit 354. As in the cathode plate 400, the manifold-forming portions 322 to 332, which are through-opening portions for forming the various manifolds during construction of the fuel cell 100, are provided outside the power generation region DA. The fuel gas supply slit 350 is disposed at an end portion (lower end in FIG. 7) of the power generation region DA in such a manner so as not to overlap with the oxidizing gas discharge slit 444 in the cathode plate 400 during construction of the separator 600. The fuel gas discharge slit 354 is disposed at an end portion (upper end in FIG. 7) of the power generation region DA in such a manner that so as not to overlap with the oxidizing gas supply slit 440 in the cathode plate 400 during construction of the separator 600.

As illustrated in FIG. 8, the intermediate plate 500 is formed of a laminate resin, unlike the plates 300 and 400. Examples of laminate resins that can be used include, for instance, polyethylene terephthalate (PET), polypropylene (PP), polyethylene naphthalate (PEN) or Kapton film. The intermediate plate 500 has, as through-opening portions that run through the intermediate plate 500 in the thickness direction thereof, four manifold-forming portions 522 to 528 for supplying/discharging a reactant gas (the oxidizing gas or the fuel gas), supply channel-forming portions 542, 546, and discharge channel-forming portions 544, 548. The intermediate plate 500 further includes, as a through-opening portion that runs substantially through the center of the plate, a cooling medium channel-forming portion 550, as well as cooling medium supply slits 551 and cooling medium discharge slits 552 that communicate with the cooling medium channel-forming portion 550. Similarly to the cathode plate 400 and the anode plate 300, the manifold-forming portions 522 to 528, which are through-opening portions for forming the various manifolds during construction of the fuel cell 100, are respectively provided outside the power generation region DA.

The conductive porous member 555 is a porous member formed of a conductive material such as stainless steel and whose surface area in the planar direction is smaller than that of the cooling medium channel-forming portion 550. The thickness of the conductive porous member 555 is substantially identical to the thickness of the intermediate plate 500 in the stacking direction. The conductive porous member 555, which is disposed at the cooling medium channel-forming portion 550, has the functions of electrically connecting the cathode plate 400 and the anode plate 300 and of serving as a channel through which the cooling medium flows when the three plates 300, 400, 500 of the separator 600 are stacked up.

The supply channel-forming portions 542, 546 and the discharge channel-forming portions 544, 548 for the reactant gases have each one end communicating with respective manifold forming portions 522 to 528. The other ends of the channel-forming portions 542, 544, 546, 548 communicate with respective gas supply/discharge slits 440, 444, 350, 354 when the three plates 300, 400, 500 are joined.

Figure 9:
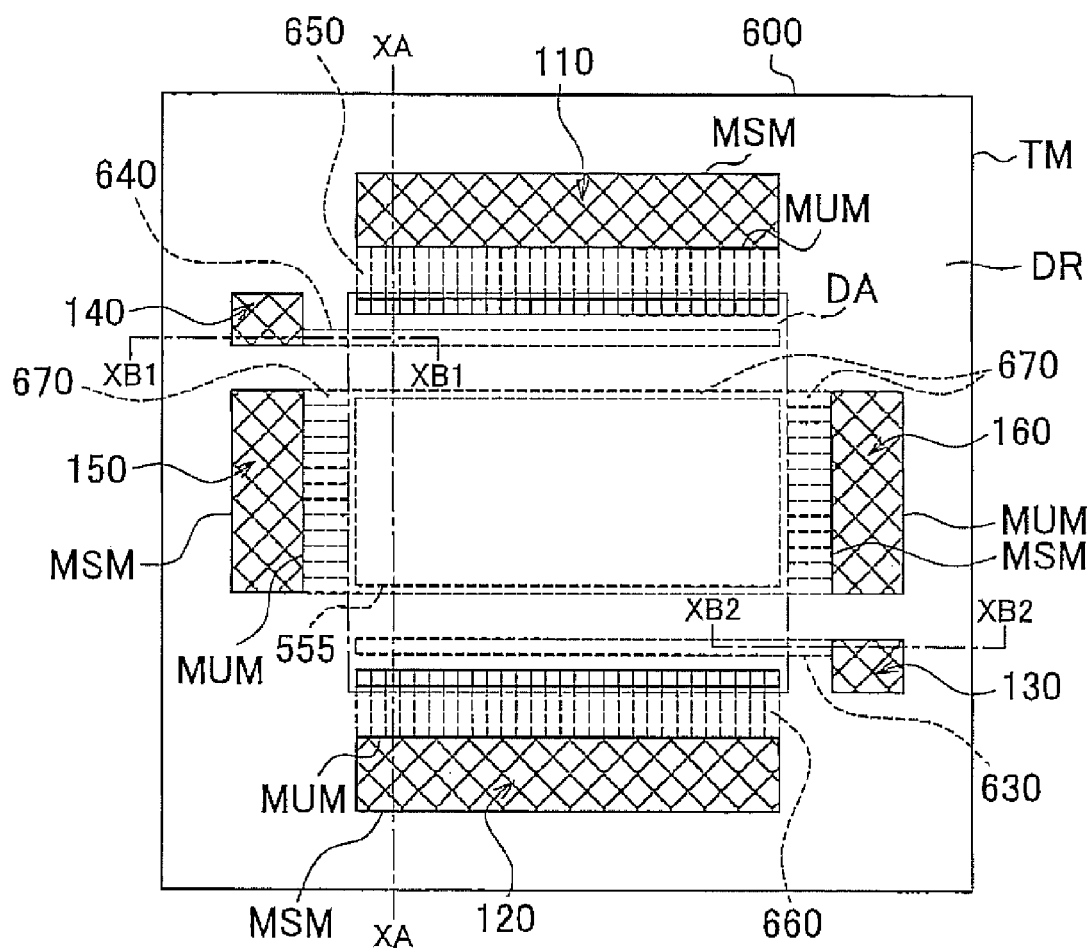
FIG. 9 is a front-view diagram of a separator.

FIG. 9 is a front-view diagram of a separator. The separator 600 is manufactured by joining the anode plate 300 and the cathode plate 400 to both sides of the intermediate plate 500, so as to sandwich the intermediate plate 500, and by punching the portions of the intermediate plate 500 that are exposed to regions that correspond to the cooling medium supply manifold 150 and the cooling medium discharge manifold 160. The three plates are stacked, and then the intermediate plate 500 is joined to the anode plate 300, and the intermediate plate 500 to the cathode plate 400, by hot pressing. As a result, a separator 600 is obtained having six manifolds 110 to 160, as through-opening portions hatched in FIG. 9, oxidizing gas supply channels 650, oxidizing gas discharge channels 660, a fuel gas supply channel 630, a fuel gas discharge channel 640, and cooling medium channels 670. The surfaces of the separator 600 that form the manifolds along the stacking direction and which communicate with the channels 630 to 670 are also called manifold inner-side-forming surfaces MUM. The surfaces of the separator 600 that form the manifolds along the stacking direction and that oppose the manifold inner-side-forming surfaces MUM are called manifold outer forming surfaces MSM.

The oxidizing gas supply channels 650 are formed by the supply channel-forming portions 542 for oxidizing gas, which are formed in the intermediate plate 500 (FIG. 8), and by the oxidizing gas supply slit 440 formed in the cathode plate 400 (FIG. 6). The oxidizing gas discharge channels 660 are formed by the discharge channel-forming portions 544 for oxidizing gas, which are formed in the intermediate plate 500 (FIG. 8), and by the oxidizing gas discharge slit 444 formed in the cathode plate 400 (FIG. 6). The fuel gas supply channel 630 is formed by the supply channel-forming portion 546 for fuel gas, which is formed in the intermediate plate 500 (FIG. 8), and by the fuel gas supply slit 350 formed in the anode plate 300 (FIG. 7). The fuel gas discharge channel 640 is formed by the discharge channel-forming portion 548 for fuel gas, which is formed in the intermediate plate 500 (FIG. 8), and by the fuel gas discharge slit 354 formed in the cathode plate 300 (FIG. 7). The cooling medium channels 670 are formed by the cooling medium channel-forming portion 550 (FIG. 8), the cooling medium supply slits 551 (FIG. 8) and the cooling medium discharge slits 552 (FIG. 8).

The explanation of the unit cell assembly 200 will be resumed now returning to FIGS. 2, 4 and 5. As illustrated in FIG. 2, the unit cell constituent member 800 is disposed at the power generation region DA, on the face of the separator 600 that is on the side of the cathode plate 400. The seal member 700 is disposed on the same face of the separator 600, at a region DR (hereinafter surrounding region DR) outside the power generation region DA. As illustrated in FIG. 5, the unit cell constituent member 800 has an MEA 810, an anode-side diffusion layer 820 disposed in contact with the anode-side face of the MEA 810, a cathode-side diffusion layer 830 in contact with the cathode-side face of the MEA 810, an anode-side porous body 840 and a cathode-side porous body 850. The anode-side porous body 840 is disposed flanking the anode-side diffusion layer 820, on the anode side of the MEA 810, while the cathode-side porous body 850 is disposed flanking the cathode-side diffusion layer 830, on the cathode side of the MEA 810. The cathode-side porous body 850 is in contact with the power generation region DA of the separator 600. When the fuel cell 100 is built up by stacking the unit cell assemblies 200, the anode-side porous body 840 comes into contact with the face of the separator 600 of another unit cell assembly 200, on the side of the anode plate 300 of this other separator 600.

The MEA 810 has an ion exchange membrane formed, for instance, of a fluororesin material or a hydrocarbon resin material that has good ion conductivity in a moist state, and catalyst layers coated on both surfaces of the ion exchange membrane. The catalyst layers contain, for example, platinum, or an alloy of platinum with another metal.

The anode-side diffusion layer 820 and the cathode-side diffusion layer 830 are formed of, for example, carbon paper, carbon felt or a carbon cloth formed by weaving yarns of carbon fiber.

The anode-side porous body 840 and the cathode-side porous body 850 are formed of a porous material having gas diffusivity and electrical conductivity, such as a metal porous body. The anode-side porous body 840 and the cathode-side porous body 850 have higher porosity than the anode-side diffusion layer 820 and the cathode-side diffusion layer 830, and have lower internal gas flow resistance than the anode-side diffusion layer 820 and the cathode-side diffusion layer 830. The anode-side porous body 840 and the cathode-side porous body 850 function as channels for allowing the reactant gases to flow, as described below.

The seal member having covering portions that cover the separator will be explained next. The seal member 700 has a support portion 710, a rib 720, an outer covering portion 730 and inner covering portions 740. The seal member 700 is formed of a material having gas impermeability, elasticity and heat resistance in the working temperature range of the fuel cell, for example, an elastic material such as rubber or an elastomer. Specific materials that can be used include, for instance, silicone-based rubbers, butyl rubbers, acrylic rubbers, natural rubbers, fluorocarbon rubbers, ethylene/propylene-based rubbers, styrene-based elastomers, fluorocarbon elastomers and the like.

The support portion 710 is in contact with the entire surrounding region DR on the surface of the separator 600 that is on the side of the cathode plate 400 (see FIGS. 2 and 5). The support portion 710 of the seal member 700 is bonded, with a predetermined bonding force, to the separator 600 at a contact surface SU (heavy line in FIG. 5) between the support portion 710 and the face of the separator 600 that is on the side of the cathode plate 400. The "predetermined bonding force" denotes a bonding force at a state in which the unit cell assemblies 200 are not stacked/fastened, i.e. at a state in which no load is applied in the stacking direction. Specifically, the bonding force of the contact surface SU may be of 0.01 N/mm (Newton per millimeter) or more per unit length of seal line, or of 0.6 N/mm or more.

The support portion 710 is integrated with the unit cell constituent member 800 by being impregnated into the edge of the unit cell constituent member 800, as indicated by the reference numeral BB in FIGS. 4 and 5. As a result, reactant gases are prevented from leaking from the cathode side of the MEA 810 towards the anode side thereof, or from the anode side of the MEA 810 towards the cathode side thereof, at the edge of the unit cell constituent member 800.

The rib 720 is formed on the upper portion of the support portion 710 in such a way so as to protrude from the support portion 710 in the stacking direction, as illustrated in FIG. 5. The rib 720 is formed in such a way so as to surround the unit cell constituent member 800 and the manifolds 110 to 160, as illustrated in FIG. 4. During construction of the fuel cell 100 through stacking of the unit cell assemblies 200, the rib 720 is brought into airtight contact with the anode plate 300 of the separator 600 of another unit cell assembly 200 through the action of a fastening force in the stacking direction.

The outer covering portion 730 is formed at the outer peripheral edge of the support portion 710 in such a way so as to cover the edge face TM of the separator 600, as illustrated in FIG. 5.

The inner covering portions 740 are formed in such a way so as to cover the manifold outer forming surfaces MSM of the manifolds of the separator 600, as illustrated in FIG. 5.

As described above, the seal member 700 is integrated with the unit cell constituent member 800 and the separator 600. In other words, the separator 600, the seal member 700 and the unit cell constituent member 800 are integrated together in the unit cell assembly 200.

The operation of the fuel cell according to the embodiment will be explained with reference to operation diagrams in FIGS. 10A and 10B of the fuel cell. FIGS. 10A and 10B are illustrative diagrams showing the flow of reactant gases in the fuel cell. For easier understanding, FIGS. 10A and 10B illustrate a state of two stacked unit cell assemblies 200. FIG. 10A illustrates a sectional view corresponding to the cross section XA-XA in FIG. 9. In FIG. 10B, the right half illustrates a sectional view corresponding to the cross section XB2-XB2 in FIG. 9, while the left half illustrates a sectional view corresponding to the cross section XB1-XB1 in FIG. 9.

As indicated by the arrows in FIG. 10A, the oxidizing gas supplied to the oxidizing gas supply manifold 110 is infused from the oxidizing gas supply manifold 110 into the cathode-side porous body 850 via the oxidizing gas supply channels 650. The oxidizing gas supplied to the cathode-side porous body 850 flows from the top down in FIGS. 4 and 9 within the cathode-side porous body 850 that has the function of channeling the oxidizing gas. The oxidizing gas is discharged to the oxidizing gas discharge manifold 120 via the oxidizing gas discharge channels 660. Part of the oxidizing gas flowing through the cathode-side porous body 850 diffuses throughout the entire cathode-side diffusion layer 830 that abuts the cathode-side porous body 850, to take part in the cathode reaction (for instance, $2H^+ + 2e^- + (\frac{1}{2})O_2 \rightarrow H_2O$).

As indicated by the arrows in FIG. 10B, the fuel gas supplied to the fuel gas supply manifold 130 is infused from the fuel gas supply manifold 130 into the anode-side porous body 840 via the fuel gas supply channel 630. The fuel gas supplied to the anode-side porous body 840 flows from the bottom up in FIGS. 4 and 9 within the anode-side porous body 840 that has the function of channeling the fuel gas. The fuel gas is discharged to the fuel gas discharge manifold 140 via the fuel gas discharge channel 640. Part of the fuel gas flowing through the anode-side porous body 840 diffuses throughout the entire anode-side diffusion layer 820 that abuts the anode-side porous body 840, to take part in the anode reaction (for instance, $H_2 \rightarrow 2H^+ + 2e^-$).

The cooling medium supplied to the cooling medium supply manifold 150 is supplied from the cooling medium supply manifold 150 into the cooling medium channels 670. The cooling medium supplied to the cooling medium channels 670 flows from one end to the other end of the cooling medium channels 670, and is discharged into the cooling medium discharge manifold 160.

In the fuel cell 100 of the embodiment, thus, the outer covering portion 730 is disposed in such a way so as to cover a peripheral edge of the separator 600 (cathode plate 400 or anode plate 300) that includes the edge face TM. The inner covering portions 740 are disposed in such a way so as to cover a manifold peripheral edge that includes the manifold outer forming surfaces MSM of the separator 600 (for instance, FIG. 5, FIGS. 10A and 10B). As a result, the outer covering portion 730 comes between the separators 600 even when the stack of unit cell assemblies 200 slips, and the separators 600 are brought close to each other on account of, for instance, external forces applied to the fuel cell 100 or on account of deterioration of the seal member 700. Hence, the separators 600 can be prevented from coming into direct contact with each other. This allows suppressing the occurrence of short circuits caused by contact between the separators 600, and allows curtailing drops in power generation efficiency in the fuel cell 100.

In the unit cell assemblies 200 of the embodiment, moreover, the MEA 810, the seal member 700 and the separator 600 are integrally formed together. This allows enhancing assemblability and handleability during stacking of the unit cell assemblies 200, while reducing the number of manufacturing steps during the manufacture of the fuel cell 100.

Figure 11:
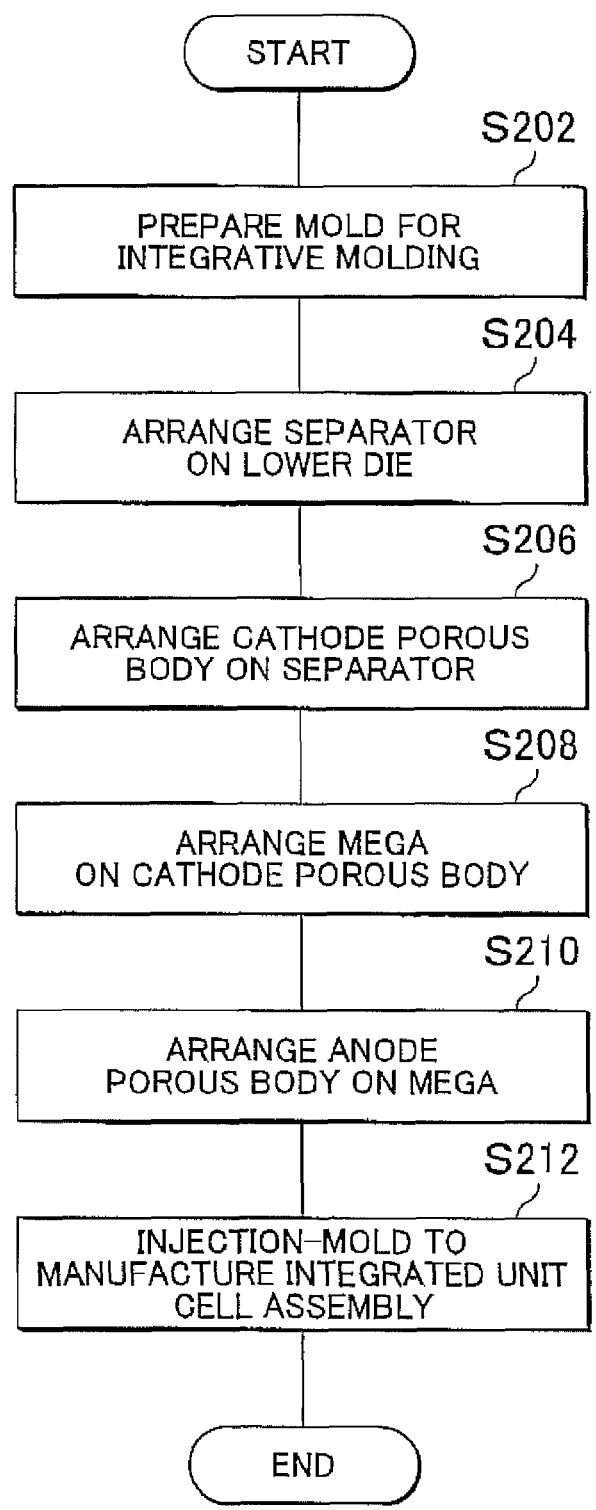
FIG. 11 is a flowchart outlining the manufacturing steps of a unit cell assembly in the first embodiment.
Figure 12A:
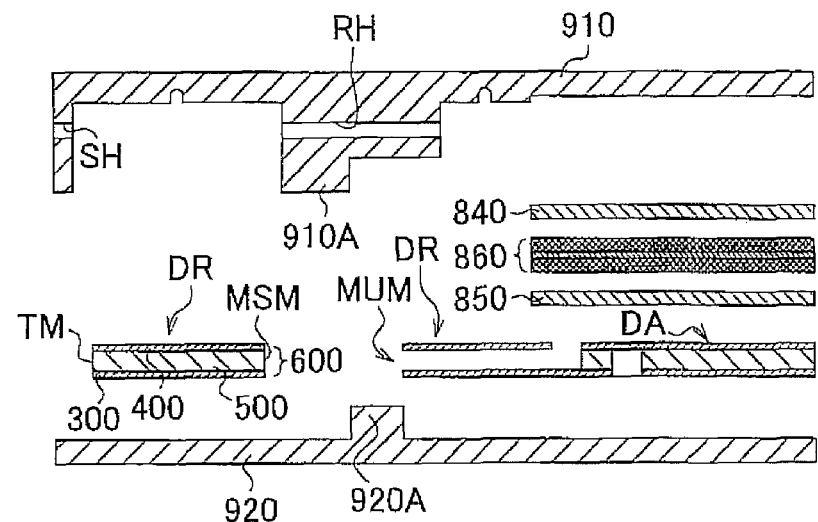
FIGS. 12A and 12B are diagrams for illustrating a molding step during the manufacture of a unit cell assembly.
Figure 12B:
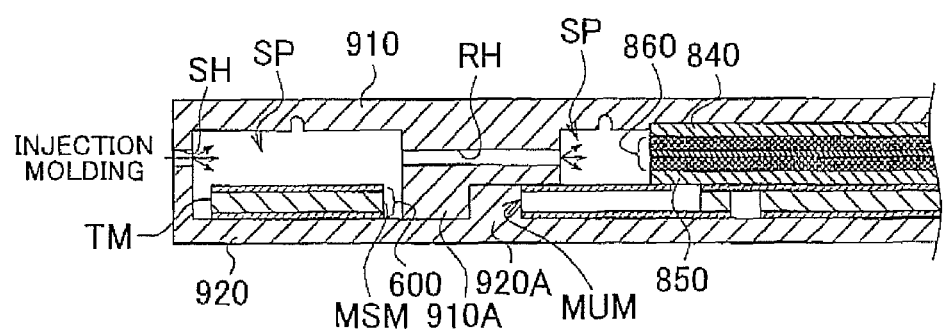
Figure 13:
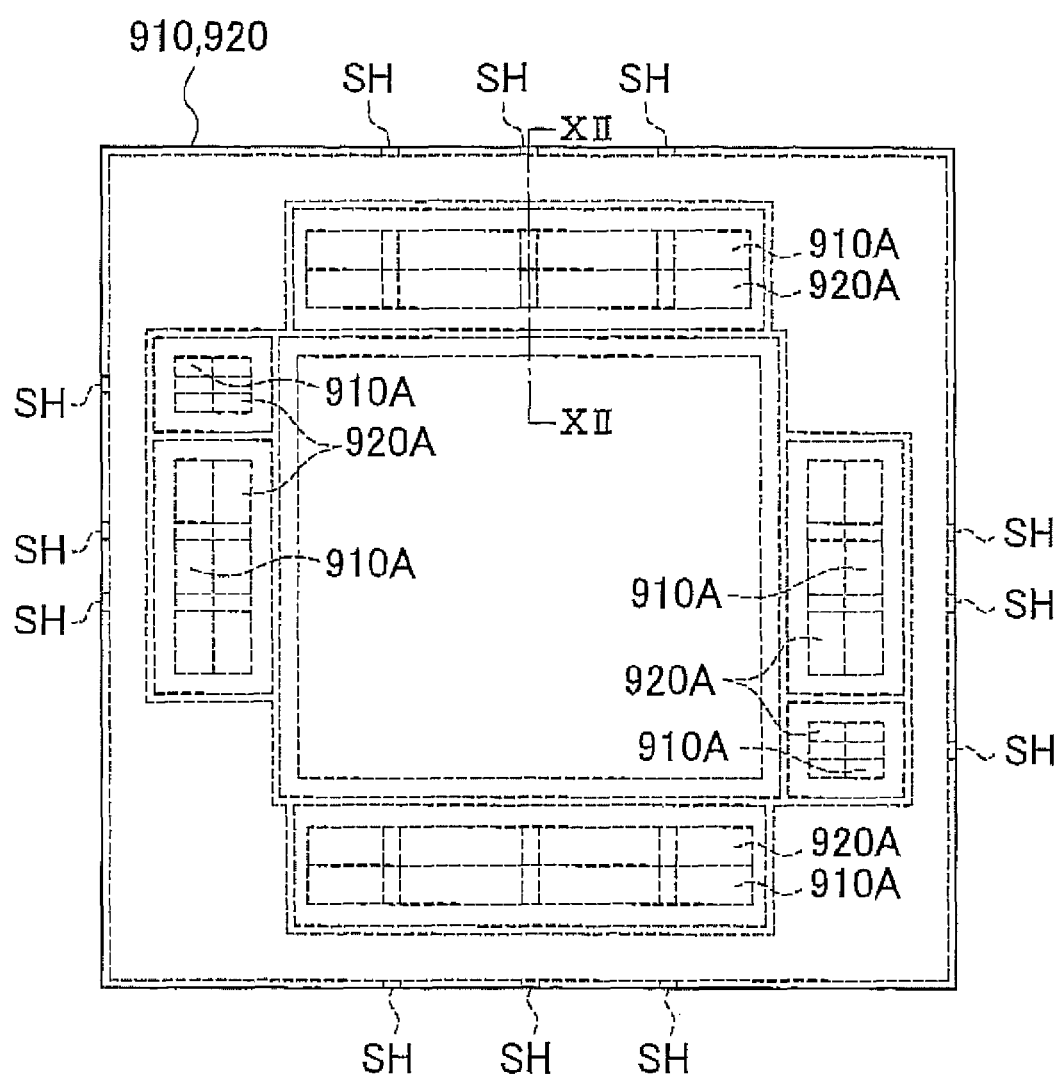
FIG. 13 is a diagram illustrating a mold.

A method for manufacturing a unit cell assembly 200 having the above-described construction will be explained next with reference to FIGS. 11, 12A, 12B and 13. FIG. 11 is a flowchart outlining the manufacturing steps of a unit cell assembly in the embodiment. FIGS. 12A and 12B are diagrams for illustrating a molding step during the manufacture of the unit cell assembly. FIG. 13 is a diagram illustrating a mold. FIGS. 12A and 12B correspond to the cross section XII-XII of FIG. 13.

A mold for integrative molding is prepared first (step S202). As illustrated in FIG. 12A, the mold has an upper die 910 and a lower die 920. As illustrated in FIGS. 12A, 12B and 13, the lower die 920 has protrusions 920A for positioning the separator 600. The upper die 910 has fitting portions 910A that fit with the protrusion 920A, as well as feed ports SH and communicating ports RH for the molding material.

The separator 600 is disposed next on the lower die 920 (step S204). The separator 600 can be positioned by arranging the separator 600 in such a manner that the manifold inner-side-forming surfaces MUM of the separator 600 abut the protrusions 920A. In the embodiment, the separator 600 is disposed on the lower die 920 with the side of the anode plate 300 facing down and the side of the cathode plate 400 facing up.

Next, the cathode-side porous body 850 is disposed on the separator 600 that is arranged on the lower die 920 (step S206). The cathode-side porous body 850 is disposed at the power generation region DA (FIG. 6 and so forth), on the face of the separator 600 that is on the side of the cathode plate 400.

A MEGA 860 is stacked then on the arranged cathode-side porous body 850 (step S208). The MEGA 860 has been obtained by hot pressing beforehand the anode-side diffusion layer 820 and the cathode-side diffusion layer 830 against both faces of the MEA 810.

The anode-side porous body 840 is stacked then on the arranged MEGA 860 (step S210).

Once the entire unit cell constituent member 800 has been thus disposed at the power generation region DA of the separator 600, the dies are clamped with a predetermined mold pressure, and injection molding is carried out (step S212). FIG. 12B illustrates the lower die 920 and the upper die 910 when clamped. In this clamped state, a space SP having the shape of the seal member 700 of the unit cell assembly 200 is formed over the surrounding region DR of the face of the separator 600 on the side of the cathode plate 400. As illustrated in FIG. 12B, the space SP is demarcated by the face of the separator 600 on the side of the cathode plate 400, the inner wall faces of the lower die 920 and the upper die 910, and the edge of the unit cell constituent member 800 (anode-side porous body 840, MEGA 860 and cathode-side porous body 850). Injection molding is performed in this space SP. Specifically, liquid rubber, as the molding material of the seal member 700, is injected into the space SP via the feed ports SH, and is then vulcanized. The communicating ports RH have the function of allowing the molding material, which is fed via the feed ports SH, to get into the space SP.

The feeding pressure of the molding material during injection molding is controlled in such a manner that the edge of the unit cell constituent member 800 becomes impregnated with the molding material (see region BB in FIGS. 4 and 5), whereby the unit cell constituent member 800 and the seal member 700 become integrated together. The bonding force at the contact surface SU (FIG. 5) between the seal member 700 and the separator 600 is ensured by adding a silane coupling agent to the molding material. After injection molding, the mold is opened to yield a unit cell assembly 200 in which the seal member 700, the unit cell constituent member 800 and the separator 600 are integrated together.

In conventional fuel cell manufacturing methods, the edge face TM of the separator 600 is pressed against the molds to position thereby the separator 600 by way of the edge face TM. In the method for manufacturing the fuel cell 100 of the embodiment, by contrast, the separator 600 is positioned by way of the manifold inner-side-forming surfaces MUM of the separator 600. Doing so allows creating a space, between the edge face TM of the separator 600 and the molds, into which the molding material can be fed. The outer covering portion 730, made of the molding material, can be formed as a result at the edge face TM of the separator 600.

In the embodiment, the separator 600 corresponds to the separator, the power generation region DA corresponds to the first region, the surrounding region DR corresponds to the second region, the unit cell constituent member 800 corresponds to the unit cell constituent member, the seal member 700 corresponds to the seal member, the outer covering portion 730 corresponds to the first insulating portion or the first covering portion, and the inner covering portions 740 correspond to the second insulating portion or the manifold insulating portion.

Figure 14:
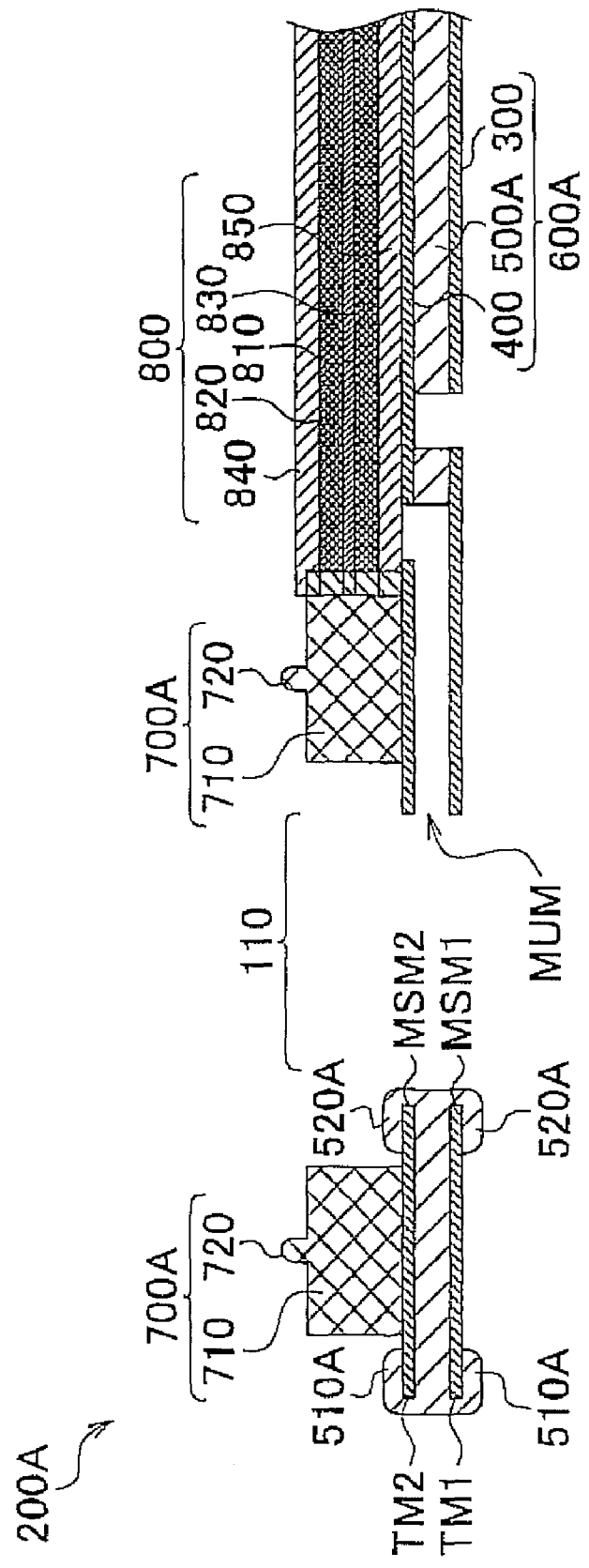
FIG. 14 is an illustrative diagram depicting the construction of a unit cell assembly in a second embodiment.

The schematic constitution of a fuel cell according to a second embodiment of the invention is explained next. FIG. 14 is an illustrative diagram depicting the construction of a unit cell assembly in a second embodiment. In a unit cell assembly 200A of the second embodiment illustrated in FIG. 14, elements identical to those of the unit cell assembly 200 of the first embodiment are denoted with the same reference numerals, and explanations thereof are omitted. Among the manifold outer forming surfaces MSM, the portions corresponding to the anode plate 300 are referred to as manifold outer forming surfaces MSM1, while the portions corresponding to the cathode plate 400 are referred to as manifold outer forming surfaces MSM2. The edge faces of the anode plate 300 and the cathode plate 400 are referred to as edge face TM1 and edge face TM2, respectively.

In the unit cell assembly 200A of the second embodiment, a seal member 700A lacks the outer covering portion 730 and the inner covering portions 740, and the shape of a separator 600A is different from that of the separator 600, as illustrated in FIG. 14. In the separator 600A of the embodiment, part of an intermediate plate 500A forms a covering portion 510A and a covering portion 520A. The covering portion 510A is disposed and fixed in such a way so as to enfold the peripheral edge of the anode plate 300 and the cathode plate 400, so that the covering portion 510A covers the edge faces TM1, TM2 of the anode plate 300 and the cathode plate 400. The covering portions 520A are disposed and fixed in such a way so as to enfold the peripheral edge of the anode plate 300 and the cathode plate 400, so that the covering portion 520A covers the manifold outer forming surfaces MSM1, MSM2 of the anode plate 300 and the cathode plate 400.

In the unit cell assembly 200A of the second embodiment, thus, the covering portion 510A and the covering portion 520A, which are part of the intermediate plate 500A, are used as short-circuit preventing members that prevent shorting between separators, instead of the outer covering portion 730 and the inner covering portions 740 of the first embodiment. The second embodiment affords thereby the same effect as the first embodiment, but without the need for providing the outer covering portion 730 and the inner covering portions 740 in the seal member. The seal member can thus be shaped easily, and the molding material can likewise be injection-molded easily.

In the embodiment, the anode plate 300 and the cathode plate 400 correspond to the conductive plate-like member of the invention, the intermediate plate 500A corresponds to the resinous plate-like member, the covering portion 510A corresponds to the first insulating portion or the second covering portion, and the covering portions 520A correspond to the second insulating portion or the manifold insulating portion.

Figure 15:
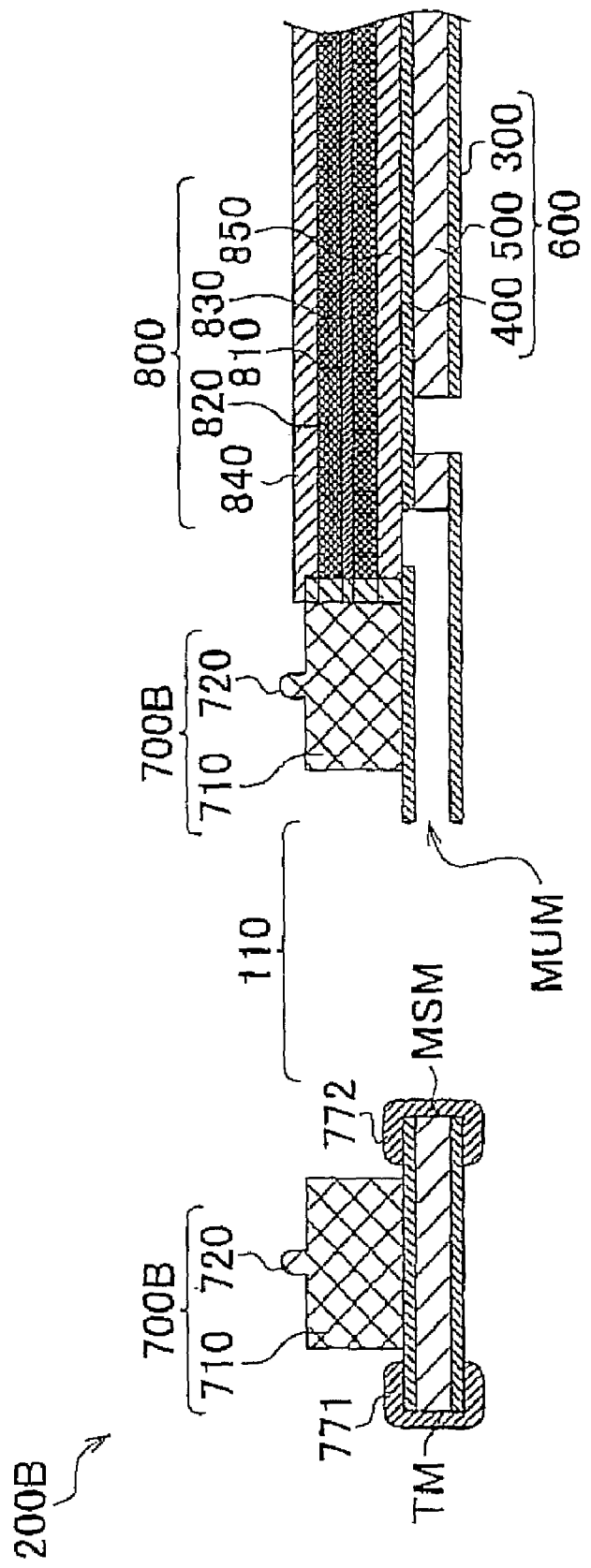
FIG. 15 is an illustrative diagram depicting the construction of a unit cell assembly in a third embodiment.

The schematic constitution of a fuel cell according to a third embodiment of the invention is explained next. FIG. 15 is an illustrative diagram depicting the construction of a unit cell assembly in a third embodiment. In a unit cell assembly 200B of the third embodiment illustrated in FIG. 15, elements identical to those of the unit cell assembly 200 of the first embodiment are denoted with the same reference numerals, and explanations thereof are omitted.

In the unit cell assembly 200B of the third embodiment, a seal member 700B lacks the outer covering portion 730 and the inner covering portions 740 but is provided with insulating cap-like members 771, 772, as illustrated in FIG. 15. The insulating cap-like member 771 is disposed in such a way so as to cover a peripheral edge of the separator 600 that includes the edge face TM. The insulating cap-like members 772 are disposed in such a way so as to cover manifold peripheral edges including the manifold outer forming surfaces MSM of the separator 600.

In the unit cell assembly 200B of the third embodiment, thus, the insulating cap-like members 771, 772 are used as short circuit preventing members that prevent shorting between separators, instead of the outer covering portion 730 and the inner covering portions 740 of the first embodiment. The third embodiment affords thereby the same effect as the first embodiment, but without the need for providing the outer covering portion 730 and the inner covering portions 740 in the seal member. The molding material can thus be shaped easily, and injection molding of the seal member can likewise be carried out easily.

The insulating cap-like member 771 or the insulating cap-like members 772 may also be made thicker, to a thickness comparable to that of the support portion 710. This allows using the insulating cap-like members for positioning and preventing slippage of the stack of unit cell assemblies 200B during stacking of the unit cell assemblies 200B in the manufacture of the fuel cell.

In the embodiment, the insulating cap-like member 771 corresponds to the first insulating portion or cap-like member of the invention. The insulating cap-like members 772 correspond to the second insulating portion.

Figure 16:
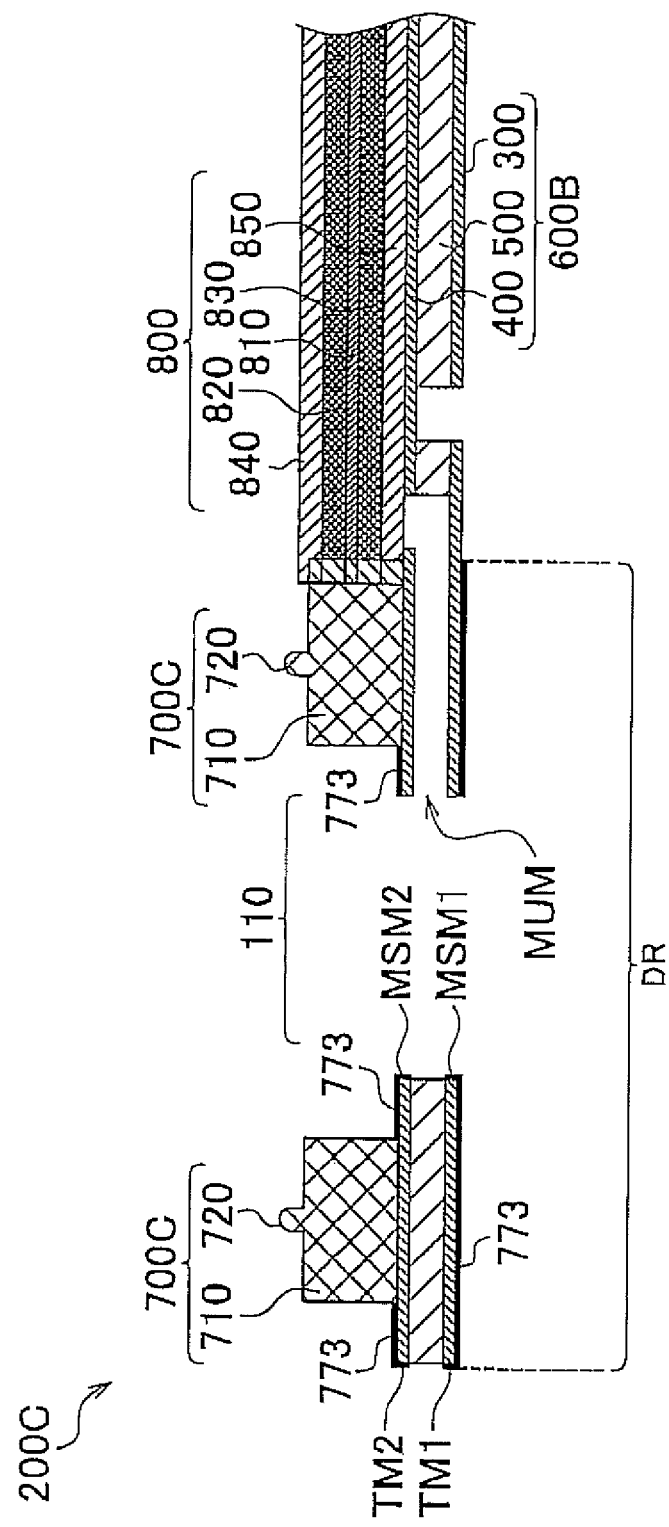
FIG. 16 is an illustrative diagram depicting the construction of a unit cell assembly in a fourth embodiment.

The schematic constitution of a fuel cell according to a fourth embodiment of the invention is explained next. FIG. 16 is an illustrative diagram depicting the construction of a unit cell assembly in a fourth embodiment. In a unit cell assembly 200C of the fourth embodiment illustrated in FIG. 16, elements identical to those of the unit cell assembly 200 of the first embodiment are denoted with the same reference numerals, and explanations thereof are omitted.

In the unit cell assembly 200C of the fourth embodiment, as shown in FIG. 16 a seal member 700C lacks the outer covering portion 730 and the inner covering portions 740. Instead, the separator 600B is provided with oxidatively-treated portions 773. The oxidatively-treated portions 773 are formed by subjecting the separator to an oxidative treatment, at the surrounding region DR of the separator 600B, on portions where the seal member 700B is not formed in the planar direction of the separator 600B, and on the edge face TM1, the edge face TM2, the manifold outer forming surfaces MSM1 and the manifold outer forming surfaces MSM2.

In the unit cell assembly 200C of the fourth embodiment, thus, the oxidatively-treated portions 773 of the separator 600B are used instead of the outer covering portion 730 and the inner covering portions 740 of the first embodiment. The fourth embodiment affords thereby the same effect as the first embodiment, without the need for providing short circuit preventing members that prevent shorting between separators. The number of parts can thus be reduced. Moreover, the outer covering portion 730 and the inner covering portions 740 need not be provided in the seal member. The seal member can thus be shaped easily, and the molding material can likewise be injection-molded easily.

In the embodiment, the oxidatively-treated portions 773 correspond to the first insulating portion, the oxidatively-treated portion, the second insulating portion or the manifold insulating portion of the invention.

Figure 17:
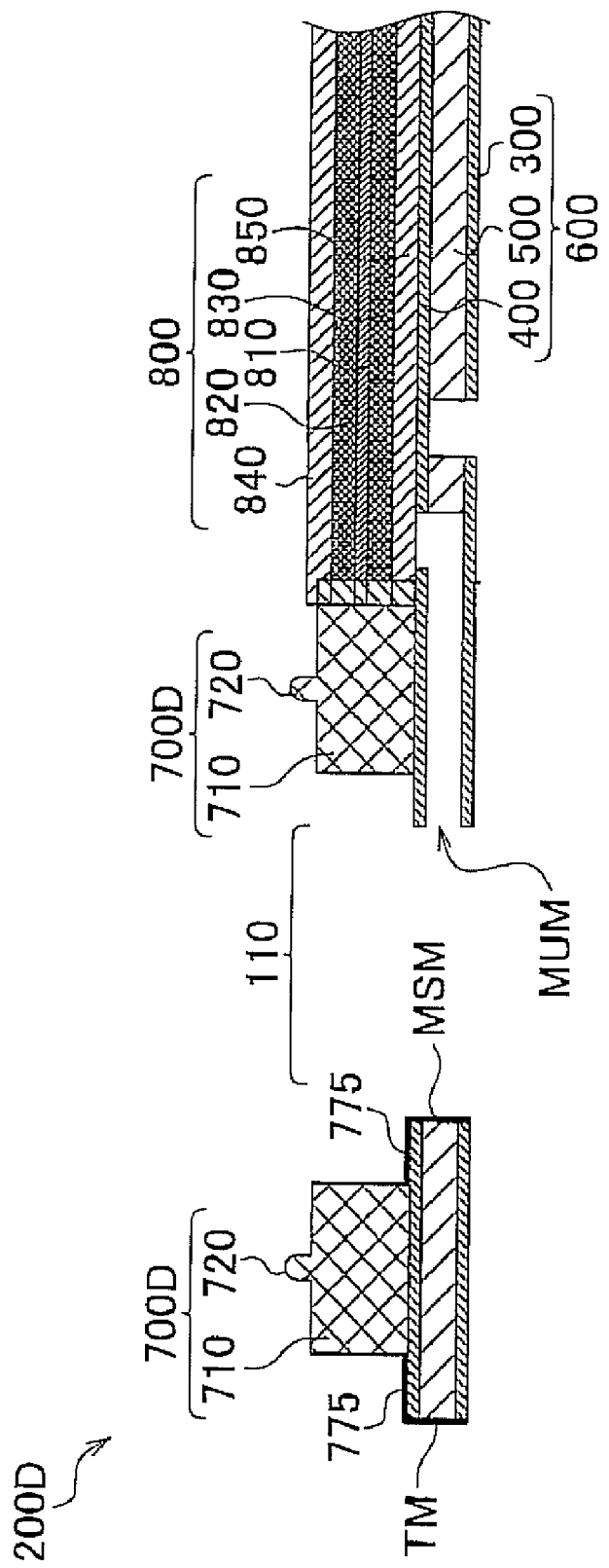
FIG. 17 is an illustrative diagram depicting the construction of a unit cell assembly in a fifth embodiment.

The schematic constitution of a fuel cell according to a fifth embodiment of the invention is explained next. FIG. 17 is an illustrative diagram depicting the construction of a unit cell assembly in a fifth embodiment. In a unit cell assembly 200D of the fifth embodiment illustrated in FIG. 17, elements identical to those of the unit cell assembly 200 of the first embodiment are denoted with the same reference numerals, and explanations thereof are omitted.

In the unit cell assembly 200D of the fifth embodiment, as shown in FIG. 17 a seal member 700D lacks the outer covering portion 730 and the inner covering portions 740. Instead, the separator 600 is coated with an insulating material 775. The insulating material 775 is made of a material, such as alumina or magnesia, having insulating properties. The insulating material 775 is coated onto the peripheral edge of the separator 600 including the edge face TM, and the manifold peripheral edges including the manifold outer forming surfaces MSM of the separator 600.

In the unit cell assembly 200D of the fifth embodiment, thus, the insulating material 775 is coated, as a short circuit preventing member that prevents shorting between separators, instead of the outer covering portion 730 and the inner covering portions 740 of the first embodiment. The fifth embodiment affords thereby the same effect as the first embodiment, but without the need for providing the outer covering portion 730 and the inner covering portions 740 in the seal member. The seal member can thus be shaped easily, and the molding material can likewise be injection-molded easily.

In the embodiment, the insulating material 775 that is coated corresponds to the first insulating portion, the second insulating portion or the manifold insulating portion of the invention.

The schematic constitution of a fuel cell according to a sixth embodiment of the invention is explained next. FIG. 18 is an illustrative diagram depicting the construction of a unit cell assembly in a sixth embodiment. In a unit cell assembly 200E of the sixth embodiment illustrated in FIG. 18, elements identical to those of the unit cell assembly 200 of the first embodiment are denoted with the same reference numerals, and explanations thereof are omitted.

In the unit cell assembly 200E of the sixth embodiment, a seal member 700E has a plurality of projections 777 extending in the stacking direction, as illustrated in FIG. 18. The projections 777 are less high than the rib 720, i.e. the projections 777 do not touch the separators 600 during stacking of the unit cell assemblies 200E. The sixth embodiment affords thereby the same effect as the first embodiment. The projections 777 can be used for positioning during stacking of the unit cell assemblies 200E in the manufacture of the fuel cell. Stack slippage of the unit cell assemblies 200E can also be prevented.

In the embodiment, the projections 777 correspond to the first projection or second projection of the invention.

The invention is not limited to the above embodiments and examples, and various modifications, for instance the below-described modifications, can be made to the invention without departing from the scope thereof.

The above embodiments specify the materials of the members of the unit cell constituent member 800 and of the members of the separator 600, but the invention is not limited to these materials, and various appropriate materials may also be used. For instance, the anode-side porous body 840 and the cathode-side porous body 850 are formed using a metal porous body, but may also be formed using other materials, for instance a carbon porous body. Likewise, the separator 600 is formed using a metal, but may also be formed using another material such as carbon.

In the above embodiments, the conductive porous member 555 is used as the member that is arranged in the cooling medium channel-forming portion 550 of the intermediate plate 500. The invention, however, is not limited thereto. A conductive corrugated plate-like member may be used instead of the conductive porous member 555. The effect of the above embodiments can be elicited at least partly also in this case.

In the examples, the seal member is formed by injection molding, but may also be formed by compression molding instead. For instance, the seal member may be obtained by thermal-vulcanization compression molding in which a solid unvulcanized rubber is filled into the space SP of the mold and the latter is then clamped and heated to carry out simultaneously shape forming and vulcanization. The effect of the above embodiments can be elicited at least partly also in this case.

In the above embodiments, the edge of the unit cell constituent member 800 is positioned within a same plane, i.e. the edge face of the unit cell constituent member 800 is formed in one plane. However, this need not necessarily be the case. The positions of the edge faces of the MEA 810, the anode-side diffusion layer 820, the cathode-side diffusion layer 830, the anode-side porous body 840 and the cathode-side porous body 850 that make up the unit cell constituent member 800 may be staggered. That is, the edge face of the unit cell constituent member 800 may be formed of a plurality of faces. The effect of the above embodiments can be elicited at least partly also in this case.

In the above embodiments, the separator 600 has a stack of three metal plates having a flat-surface shape. However, the separator 600 may be constructed in any other may, and the shape of the separator 600 may be any other shape. The effect of the above embodiments can be elicited at least partly also in this case.

What is claimed is:

1. A unit cell assembly stacked in a plurality to form a fuel cell, comprising:
    a separator having a face that includes a first region and a second region that surrounds the first region;
    a unit cell constituent member disposed on and contacting the first region on the face of the separator;
    an elastic seal member deposed on and bonded to the second region of the face of the separator, and said seal member being integrated with at least part of a peripheral side edge of the unit cell constituent member; and
    a first insulating portion having insulating properties and provided at least on part of a peripheral edge of the separator.

2. The unit cell assembly according to claim 1, wherein the first insulating portion is provided at an edge face of the separator.

3. The unit cell assembly according to claim 1, wherein the seal member comprises, as the first insulating portion, a first covering portion that covers an edge face at a peripheral edge of the separator.

4. The unit cell assembly according to claim 1, wherein the first insulating portion is a cap-like member that covers an edge face at a peripheral edge of the separator.

5. The unit cell assembly according to claim 1, wherein the separator comprises a conductive plate-like member and a resinous plate-like member formed of a resin, and
    the resinous plate-like member comprises a second covering portion, as the first insulating portion, that covers an edge face of the conductive plate-like member at a peripheral edge of the separator.

6. The unit cell assembly according to claim 1, wherein the first insulating portion is an oxidatively-treated portion formed by subjecting the separator to an oxidative treatment.

7. The unit cell assembly according to claim 1, wherein the first insulating portion is formed by coating at least part of a peripheral edge of the separator with alumina or magnesia.

8. The unit cell assembly according to claim 1, wherein the first insulating portion comprises a first projection extending in a thickness direction of the unit cell assembly.

9. The unit cell assembly according to claim 1, wherein the separator comprises a manifold, which extends through a thickness direction of the unit cell assembly, and through which a reactant gas or a cooling medium flows, and
    the unit cell assembly comprises a second insulating portion having insulating properties and provided at a peripheral edge of the manifold of the separator.

10. The unit cell assembly according to claim 9, wherein a peripheral edge of the manifold has a manifold inner-side-forming surface positioned on the side of the first region, and
the second insulating portion covers a forming surface other than the manifold inner-side-forming surface.

11. The unit cell assembly according to claim 9, wherein the second insulating portion comprises a second projection extending in a thickness direction of the unit cell assembly.

12. A fuel cell, comprising a stack of a plurality of unit cell assemblies according to claim 1.

13. The unit cell assembly of claim 1, wherein the separator includes a manifold, which extends through a thickness direction of the unit cell assembly and through which a reactant gas or a cooling medium flows, and wherein
a first projection extends in a thickness direction from a portion of the sealing member positioned between the manifold and the unit cell constituent member; and
a second projection extends in a thickness direction from a portion of the sealing member positioned between the manifold and the peripheral edge of the separator.

14. A unit cell assembly stacked in a plurality to form a fuel cell, comprising:
a separator provided with a manifold, which extends through a thickness direction of the unit cell assembly, and through which a reactant gas or a cooling medium flows said separator having a face that includes a first region and a second region that surrounds the first region;
a unit cell constituent member disposed on and contacting the first region on the face of the separator;
an elastic seal member disposed on and bonded to the second region on the face of the separator, and said seal member being integrated with at least part of a peripheral side edge of the unit cell constituent member; and
a manifold insulating portion having insulating properties and provided at least on part of a peripheral edge of the manifold of the separator.

15. A fuel cell, comprising a stack of a plurality of unit cell assemblies according to claim 14.

16. The unit cell assembly of claim 14, wherein a first projection extends in a thickness direction from a portion of the sealing member positioned between the manifold and the unit cell constituent member; and wherein a second projection extends in a thickness direction from a portion of the sealing member positioned between the manifold and the peripheral edge of the separator.

17. A method for manufacturing a unit cell assembly, in which a separator and a unit cell constituent member are stacked, the separator having a face that includes a first region and a second region that surrounds the first region, the method comprising the steps of:
arranging the unit cell constituent member on and contacting the first region on the face of the separator;
molding an elastic seal member so as to be disposed on and bonded to the second region surrounding the first region on the face of the separator and integrating the seal member with a peripheral side edge of the unit cell constituent member; and
providing an insulating portion at a peripheral edge of the separator.

18. A method for manufacturing a unit cell assembly, in which a separator and a unit cell constituent member are stacked, the separator having a face that includes a first region and a second region that surrounds the first region, the method comprising the steps of:
arranging the separator in a mold;
arranging the unit cell constituent member on and contacting the first region on the face of the separator;
molding a seal member through injection molding or compression molding of an elastic molding material in a space that is demarcated by the second region surrounding the first region on the face of the separator, a peripheral side edge of the unit cell constituent member, and the mold; such that the seal member is disposed on and bonded to the second region and the seal member is integrated with the peripheral side edge of the unit cell constituent member; and
providing an insulating portion at a peripheral edge of the separator.

19. The method for manufacturing a unit cell assembly according to claim 18, wherein the separator is arranged in such a manner that a space is formed between a peripheral edge of the separator and the mold, and
the insulating portion is a seal member molded in a space between the peripheral edge of the separator and the mold.

20. The method for manufacturing a unit cell assembly according to claim 19, wherein the separator comprises a manifold, which extends through a thickness direction of the unit cell assembly, and through which a reactant gas or a cooling medium flows;
the manifold comprises a manifold inner-side-forming surface positioned on the side of the first region; and
the separator is arranged by being positioned through abutting of the manifold inner-side-forming surface against a protrusion provided in the mold.

* * * * *